(12) United States Patent
Yoshida et al.

(10) Patent No.: US 11,458,705 B2
(45) Date of Patent: Oct. 4, 2022

(54) LAMINATED GLASS

(71) Applicant: SEKISUI CHEMICAL CO., LTD., Osaka (JP)

(72) Inventors: Shougo Yoshida, Kouka (JP); Moyuru Okano, Kouka (JP); Atsushi Nohara, Kouka (JP); Yoshikazu Masuyama, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/651,271

(22) PCT Filed: Sep. 27, 2018

(86) PCT No.: PCT/JP2018/035937
§ 371 (c)(1),
(2) Date: Mar. 26, 2020

(87) PCT Pub. No.: WO2019/065839
PCT Pub. Date: Apr. 4, 2019

(65) Prior Publication Data
US 2020/0230921 A1 Jul. 23, 2020

(30) Foreign Application Priority Data
Sep. 27, 2017 (JP) .............................. JP2017-186538

(51) Int. Cl.
*B32B 17/10* (2006.01)
*B32B 27/08* (2006.01)
(Continued)

(52) U.S. Cl.
CPC .......... *B32B 17/10036* (2013.01); *B32B 7/02* (2013.01); *B32B 17/10* (2013.01);
(Continued)

(58) Field of Classification Search
CPC ......... B32B 7/00–7/14; B32B 17/00–17/1099; C03C 3/00–3/328; C03C 17/00–17/44
See application file for complete search history.

(56) References Cited

U.S. PATENT DOCUMENTS 5,318,931 A * 6/1994 Nakaguchi .............. C03C 3/095
501/64
2006/0050425 A1 3/2006 Muromachi et al.
(Continued)

FOREIGN PATENT DOCUMENTS

CN 102686530 A 9/2012
CN 105189400 A 12/2015
(Continued)

OTHER PUBLICATIONS

International Search Report for the Application No. PCT/JP2018/035937 dated Jan. 8, 2019.
(Continued)

*Primary Examiner* — Prashant J Khatri
(74) *Attorney, Agent, or Firm* — Cheng Law Group, PLLC

(57) ABSTRACT

Provided is a laminated glass capable of preventing scorching in an end part of the laminated glass. A laminated glass according to the present invention is a laminated glass including a first glass plate, a second glass plate, and an interlayer film, at least one of the first glass plate and the second glass plate being a heat ray absorbing plate glass conforming to JIS R3208:1998, each of the first glass plate and the second glass plate having a thickness of 1.9 mm or less, when a layer having a lowest glass transition temperature in the interlayer film being referred to as a layer X, the layer X containing a thermoplastic resin, a ratio of a weight average molecular weight of the thermoplastic resin in the layer X before the light irradiation test, to a weight average
(Continued)

molecular weight of the thermoplastic resin in the layer X after the light irradiation test being 2 or less.

12 Claims, 4 Drawing Sheets

(51) Int. Cl.
| | |
|---|---|
| *B32B 27/30* | (2006.01) |
| *B60J 1/00* | (2006.01) |
| *B60J 1/02* | (2006.01) |
| *B60J 1/08* | (2006.01) |
| *B32B 7/02* | (2019.01) |

(52) U.S. Cl.
CPC .. *B32B 17/10761* (2013.01); *B32B 17/10788* (2013.01); *B32B 27/08* (2013.01); *B32B 27/30* (2013.01); *B32B 27/306* (2013.01); *B60J 1/001* (2013.01); *B32B 2250/40* (2013.01); *B32B 2307/306* (2013.01); *B32B 2315/08* (2013.01); *B32B 2329/06* (2013.01); *B32B 2331/04* (2013.01); *B32B 2605/006* (2013.01); *B32B 2605/08* (2013.01); *B60J 1/02* (2013.01); *B60J 1/08* (2013.01)

(56) References Cited

U.S. PATENT DOCUMENTS

| | | | |
|---|---|---|---|
| 2009/0237782 A1* | 9/2009 | Takamatsu | B32B 17/10761 359/359 |
| 2012/0052310 A1 | 3/2012 | Keller et al. | |
| 2012/0244329 A1 | 9/2012 | Iwamoto et al. | |
| 2012/0244364 A1 | 9/2012 | Iwamoto et al. | |
| 2013/0321904 A1* | 12/2013 | Costin | G06F 30/20 359/350 |
| 2013/0337247 A1 | 12/2013 | Kitano et al. | |
| 2014/0093739 A1 | 4/2014 | Iwamoto et al. | |
| 2014/0227536 A1 | 8/2014 | Iwamoto et al. | |
| 2016/0096349 A1* | 4/2016 | Lu | B32B 27/08 428/217 |
| 2016/0214352 A1* | 7/2016 | Yoshida | B32B 17/10761 |
| 2016/0214354 A1* | 7/2016 | Yoshida | B32B 27/22 |
| 2016/0236446 A1* | 8/2016 | Nakayama | B32B 17/10633 |
| 2017/0072665 A1 | 3/2017 | Iwamoto et al. | |
| 2017/0182745 A1 | 6/2017 | Iwamoto et al. | |
| 2017/0182746 A1 | 6/2017 | Iwamoto et al. | |
| 2017/0182747 A1 | 6/2017 | Iwamoto et al. | |
| 2017/0182748 A1 | 6/2017 | Iwamoto et al. | |
| 2017/0197395 A1 | 7/2017 | Iwamoto et al. | |
| 2017/0217132 A1 | 8/2017 | Iwamoto et al. | |
| 2017/0246842 A1 | 8/2017 | Iwamoto et al. | |
| 2017/0253704 A1 | 9/2017 | Yoshida | |
| 2017/0259533 A1 | 9/2017 | Yamamoto et al. | |
| 2017/0313033 A1 | 11/2017 | Iwamoto et al. | |
| 2017/0334173 A1 | 11/2017 | Yui et al. | |
| 2017/0361575 A1 | 12/2017 | Kusudou et al. | |
| 2018/0290436 A1 | 10/2018 | Yui et al. | |
| 2018/0290437 A1 | 10/2018 | Kobayashi et al. | |
| 2018/0290439 A1 | 10/2018 | Kusudou et al. | |
| 2019/0375196 A1 | 12/2019 | Yui et al. | |
| 2020/0094529 A1 | 3/2020 | Iwamoto et al. | |
| 2020/0346438 A1 | 11/2020 | Iwamoto et al. | |

FOREIGN PATENT DOCUMENTS

| | | |
|---|---|---|
| CN | 105383138 A | 3/2016 |
| CN | 106660868 A | 5/2017 |
| CN | 106715355 A | 5/2017 |
| CN | 107074645 A | 8/2017 |
| EP | 1 698 600 A1 | 9/2006 |
| EP | 3 219 686 A1 | 9/2017 |
| JP | 5-58670 A | 3/1993 |
| JP | 5-62539 U | 8/1993 |
| JP | 2003-327454 A | 11/2003 |
| JP | 2004-26547 A | 1/2004 |
| JP | 2004-51466 A | 2/2004 |
| JP | 2011-11941 A | 1/2011 |
| JP | 2013-6729 A | 1/2013 |
| JP | 2015-164892 A | 9/2015 |
| JP | 2016-108229 A | 6/2016 |
| JP | 2016-222507 A | 12/2016 |
| WO | WO-2015/046584 A1 | 4/2015 |
| WO | WO-2015/147302 A1 | 10/2015 |
| WO | WO-2016/039477 A1 | 3/2016 |
| WO | WO-2016/076336 A1 | 5/2016 |

OTHER PUBLICATIONS

International Preliminary Report on Patentability for Application No. PCT/JP2018/035937 dated Oct. 18, 2019.
Written Opinion of the International Searching Authority (PCT/ISA/237) for Application No. PCT/JP2018/035937 dated Jan. 8, 2019.
Supplementary European Search Report for the Application No. EP 18 860 870.7 dated May 20, 2021.
The First Office Action for the Application No. 201880062120.0 from The State Intellectual Property Office of the People's Republic of China dated Dec. 3, 2021.
Notification of Reasons for Refusal for the Application No. 2018-552016 from Japan Patent Office dated Apr. 26, 2022.

\* cited by examiner

[FIG. 1]
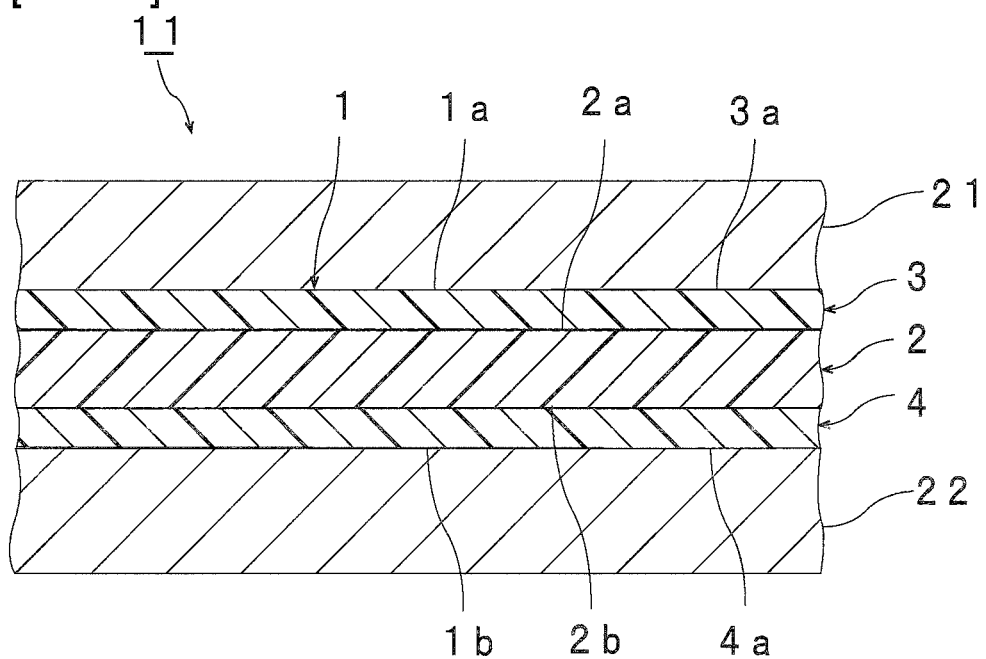
[FIG. 2]
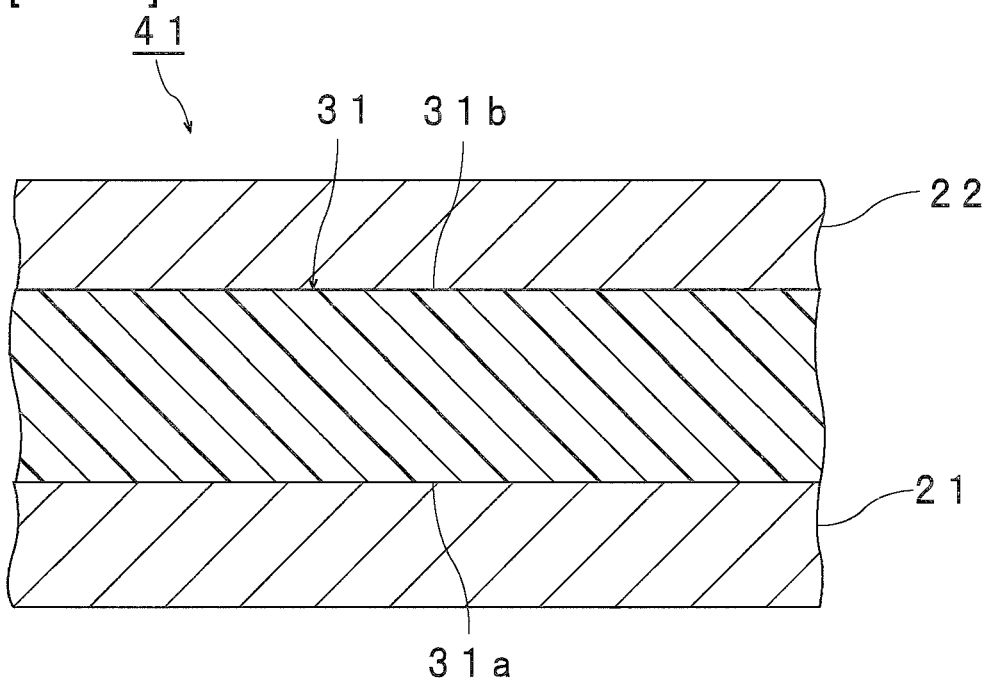

[FIG. 3]
(a)
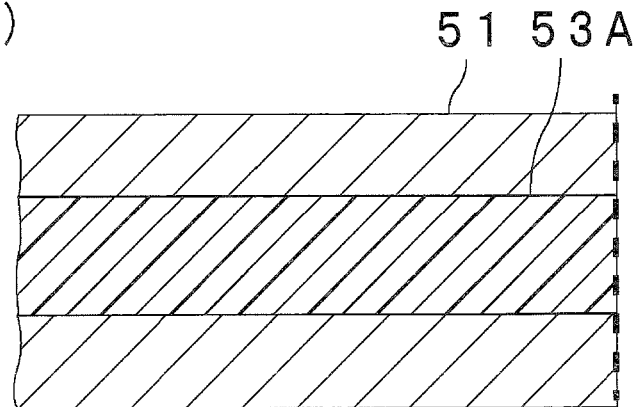
(b)
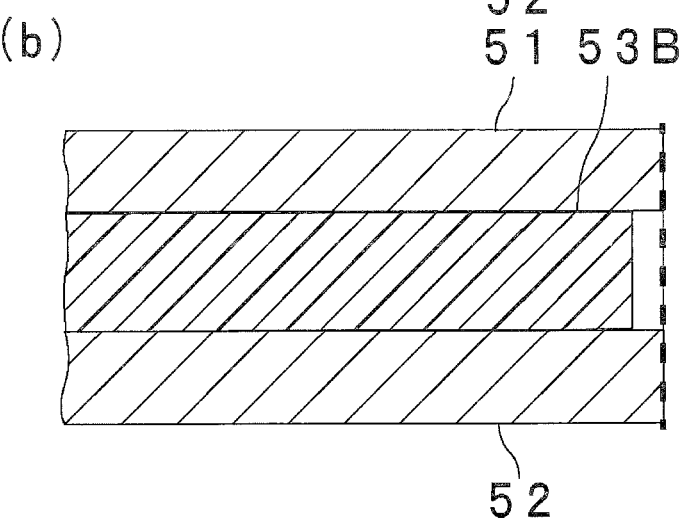
(c)
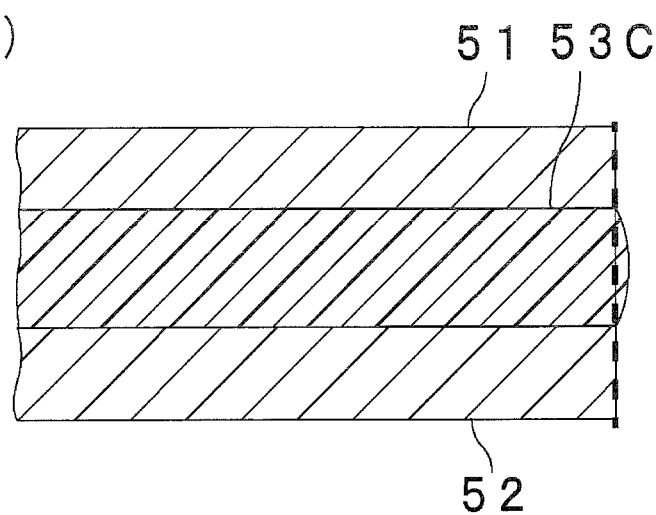

[FIG. 4]
(a)
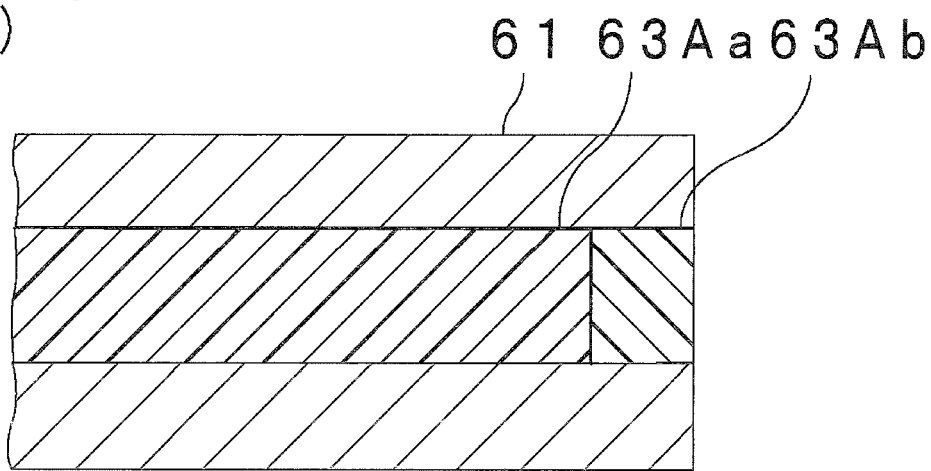
(b)
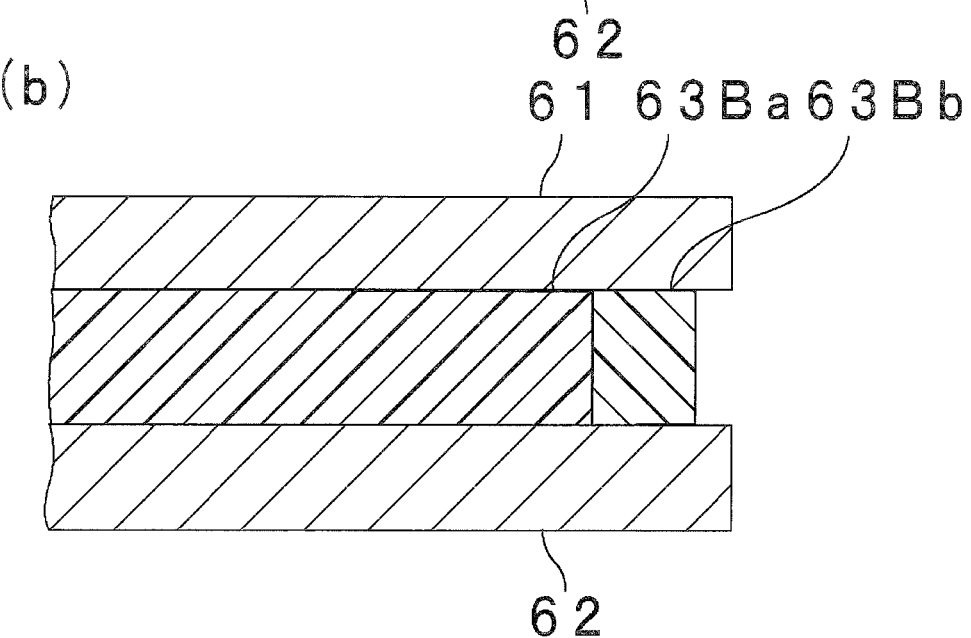

[FIG. 5]
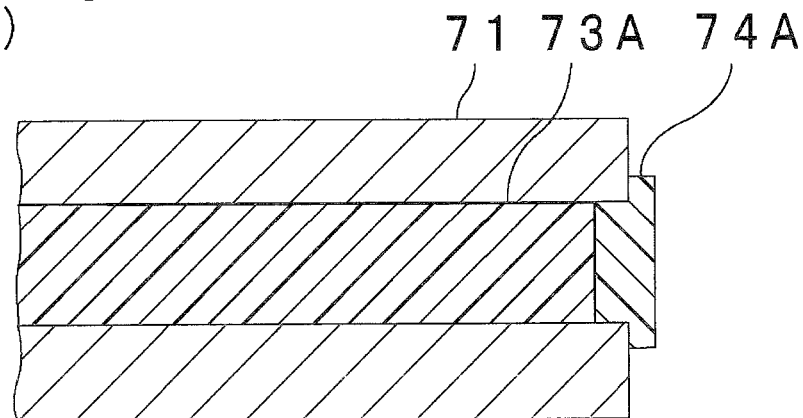
(a)
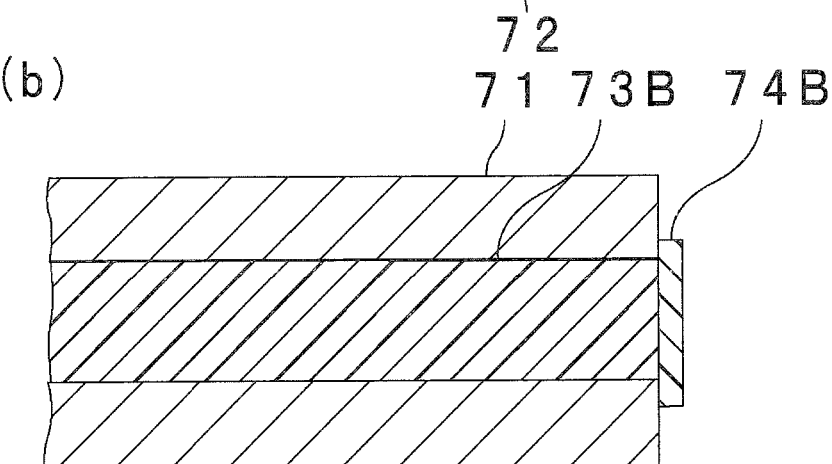
(b)
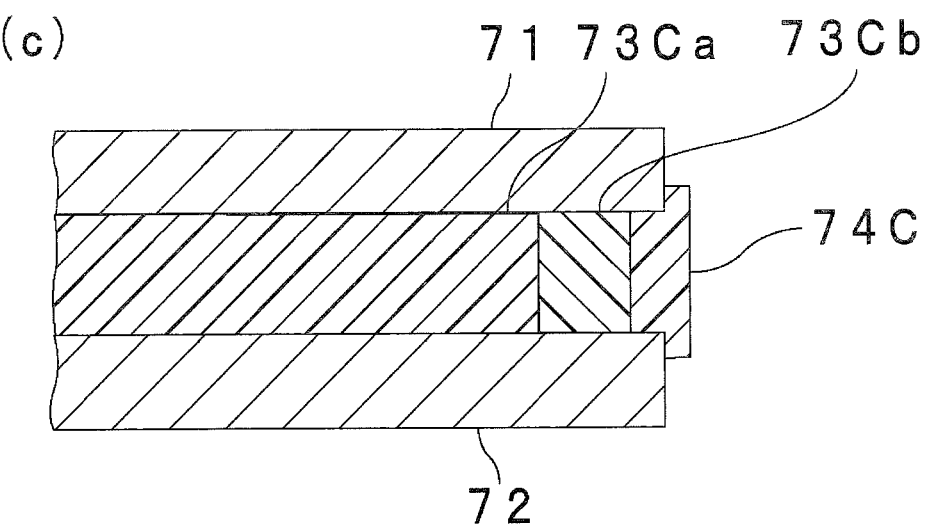
(c)

LAMINATED GLASS

TECHNICAL FIELD

The present invention relates to a laminated glass in which an interlayer film is sandwiched between a pair of glass plates.

BACKGROUND ART

Since laminated glass generates only a small amount of scattering glass fragments even when subjected to external impact and broken, the laminated glass is excellent in safety. As such, the laminated glass is widely used for automobiles, railway vehicles, aircraft, ships, buildings and the like. The laminated glass is produced by sandwiching an interlayer film between a pair of glass plates.

As one example of the laminated glass, the following Patent Document 1 discloses laminated glass having an interlayer film containing a polyvinyl acetal resin, an ultraviolet absorber, a plasticizer, an adhesive force regulator, and an oxidation inhibitor. The ultraviolet absorber used in the interlayer film is a malonic ester compound and/or an oxanilide compound.

The following Patent Document 2 discloses laminated glass having an interlayer film having low yellowing tendency, high transmittance to UV-A rays and visible light, and low transmittance to UV-B rays. The interlayer film contains a polyvinyl acetal, a plasticizer, and an oxanilide type compound which is an UV absorber.

RELATED ART DOCUMENT

Patent Document

Patent Document 1: JP 2003-327454 A
Patent Document 2: US 2012/0052310 A1

SUMMARY OF THE INVENTION

Problems to be Solved by the Invention

For example, laminated glass in an automobile is exposed to the sunlight while the automobile is travelling. Also an end part of a laminated glass in an automobile is often disposed to come into contact with the body having elevated temperature due to exposure to the sunlight, or disposed near the body. Therefore, an end part of a laminated glass in an automobile can be exposed to high temperature.

In conventional laminated glass, discoloration can occur due to scorching in an end part of the laminated glass exposed under high temperature.

Recently, in automobiles, a laminated glass is more often used in the condition that an end part of the laminated glass is exposed. Since the exposed end part of the laminated glass is directly irradiated with the sunlight, discoloration due to scorching can occur more significantly. When the interlayer film contains a heat shielding substance so as to prevent the internal temperature of the vehicle from rising, heat is more likely to remain in the interlayer film, and discoloration due to scorching is more likely to occur.

It is an object of the present invention to provide a laminated glass capable of preventing scorching in an end part of a laminated glass.

The interlayer film in the laminated glass according to the present invention may or may not contain a heat shielding substance. An exclusive object of the present invention is to provide a laminated glass capable of preventing scorching in an end part of the laminated glass even when the interlayer film contains a heat shielding substance.

Means for Solving the Problems

According to a broad aspect of the present invention, there is provided a laminated glass including a first glass plate, a second glass plate, and an interlayer film, the interlayer film being arranged between the first glass plate and the second glass plate, at least one of the first glass plate and the second glass plate being a heat ray absorbing plate glass conforming to JIS R3208:1998, each of the first glass plate and the second glass plate having a thickness of 1.9 mm or less, the interlayer film having an one-layer structure or a two or more-layer structure, when a layer having a lowest glass transition temperature in the interlayer film being referred to as a layer X, the layer X containing a thermoplastic resin, a ratio of a weight average molecular weight of the thermoplastic resin in a layer X before a light irradiation test, to a weight average molecular weight of the thermoplastic resin in a layer X after the light irradiation test in a measurement of weight average molecular weight of the layer X being 2 or less.

The light irradiation test includes: setting a thickness of the layer X to 150 µm to obtain the layer X before the light irradiation test; and subjecting the layer X before the light irradiation test to irradiation with xenon light at a black panel temperature of 63° C., a temperature inside a vessel of 50° C. and a humidity of 50% RH for 150 hours to obtain the layer X after the light irradiation test. The irradiation with xenon light is conducted with an irradiance of 60 W/m$^2$, a wavelength for measuring the irradiance of 300 to 400 nm, an inner filter of quartz, and an outer filter of quartz: #275 (cutoff 275 nm).

The measurement of weight average molecular weight is conducted by measuring, for each of the layer X before the light irradiation test, and the layer X after the light irradiation test, a weight average molecular weight at a position of 70 mm inwardly from a lateral surface of the layer X.

In a specific aspect of the laminated glass according to the present invention, the heat ray absorbing plate glass has a solar transmittance of 68% or less.

In a specific aspect of the laminated glass according to the present invention, the interlayer film contains a heat shielding substance.

In a specific aspect of the laminated glass according to the present invention, Tts of the laminated glass measured in conformity with ISO 13837 is 60% or less.

In a specific aspect of the laminated glass according to the present invention, Tts of the first glass plate measured in conformity with ISO 13837 and Tts of the second glass plate measured in conformity with ISO 13837 are different from each other.

In a specific aspect of the laminated glass according to the present invention, the thermoplastic resin in the layer X is a polyvinyl acetal resin, an ionomer resin or an ethylene-vinyl acetate copolymer resin, or the thermoplastic resin in the layer X is a thermoplastic elastomer.

In a specific aspect of the laminated glass according to the present invention, the interlayer film has a two or more-layer structure, the interlayer film includes the layer X as a first layer, the interlayer film includes a second layer containing a thermoplastic resin, and the second layer is arranged on a first surface side of the first layer.

In a specific aspect of the laminated glass according to the present invention, the interlayer film has a three or more-layer structure, the interlayer film includes a third layer containing a thermoplastic resin, and the third layer is arranged on a second surface side opposite to the first surface of the first layer.

In a specific aspect of the laminated glass according to the present invention, there is a portion where a lateral surface of the interlayer film is exposed in the laminated glass.

In a specific aspect of the laminated glass according to the present invention, black coating is not applied on an adhesion surface between an end part of the interlayer film and an end part of the first glass plate in the portion where the lateral surface of the interlayer film is exposed in the laminated glass, and black coating is not applied on an adhesion surface between an end part of the interlayer film and an end part of the second glass plate in the portion where the lateral surface of the interlayer film is exposed in the laminated glass.

In a specific aspect of the laminated glass according to the present invention, the laminated glass is used as glass for windshield in automobiles.

In a specific aspect of the laminated glass according to the present invention, the laminated glass is used as side glass, roof glass or glass for backlight in automobiles.

Effect of the Invention

The laminated glass according to the present invention is a laminated glass including a first glass plate, a second glass plate, and an interlayer film. In the laminated glass according to the present invention, the interlayer film is arranged between the first glass plate and the second glass plate. In the laminated glass according to the present invention, at least one of the first glass plate and the second glass plate is a heat ray absorbing plate glass conforming to JIS R3208:1998. In the laminated glass according to the present invention, each of the first glass plate and the second glass plate has a thickness of 1.9 mm or less. In the laminated glass according to the present invention, the interlayer film has a one-layer structure or a two or more-layer structure. In the laminated glass according to the present invention, when the layer having a lowest glass transition temperature in the interlayer film is referred to as a layer X, the layer X contains a thermoplastic resin. In the laminated glass according to the present invention, a ratio of a weight average molecular weight of the thermoplastic resin in the layer X before the light irradiation test to a weight average molecular weight of the thermoplastic resin in the layer X after the light irradiation test is 2 or less. Since the laminated glass according to the present invention has the above configuration, scorching in an end part of the laminated glass can be prevented.

BRIEF DESCRIPTION OF DRAWINGS

FIG. 1 is a sectional view schematically showing laminated glass in accordance with a first embodiment of the present invention.

FIG. 2 is a sectional view schematically showing laminated glass in accordance with a second embodiment of the present invention.

FIGS. 3(a), (b) and (c) are views for illustrating a lateral surface of laminated glass.

FIGS. 4(a) and (b) are views for illustrating an interlayer film of laminated glass.

FIGS. 5(a), (b) and (c) are views for illustrating an interlayer film of laminated glass.

MODE(S) FOR CARRYING OUT THE INVENTION

Hereinafter, the present invention will be described in detail.

A laminated glass according to the present invention includes a first glass plate, a second glass plate, and an interlayer film. The interlayer film is arranged between the first glass plate and the second glass plate.

In the laminated glass according to the present invention, at least one of the first glass plate and the second glass plate is a heat ray absorbing plate glass conforming to JIS R3208:1998. Each of the first glass plate and the second glass plate has a thickness of 1.9 mm or less.

In the laminated glass according to the present invention, the interlayer film has a one-layer structure or a two or more-layer structure. The layer having a lowest glass transition temperature in the interlayer film is referred to as a layer X. The layer X contains a thermoplastic resin.

In the laminated glass according to the present invention, a ratio of a weight average molecular weight of the thermoplastic resin in the layer X before the light irradiation test to a weight average molecular weight of the thermoplastic resin in the layer X after the light irradiation test is 2 or less. A weight average molecular weight of the thermoplastic resin in the layer X after the light irradiation test is sometimes referred to as a weight average molecular weight B after the light irradiation test. A weight average molecular weight of the thermoplastic resin in the layer X before the light irradiation test is sometimes referred to as a weight average molecular weight A before light irradiation test. The ratio is a ratio (weight average molecular weight A before light irradiation test/weight average molecular weight B after light irradiation test).

The light irradiation test includes: setting a thickness of the layer X to 150 μm to obtain the layer X before the light irradiation test; and subjecting the layer X before the light irradiation test to irradiation with xenon light at a black panel temperature of 63° C., a temperature inside a vessel of 50° C. and a humidity of 50% RH for 150 hours to obtain the layer X after the light irradiation test. The irradiation with xenon light is conducted with an irradiance of 60 W/m$^2$, a wavelength for measuring the irradiance of 300 to 400 nm, an inner filter of quartz, and an outer filter of quartz: #275 (cutoff 275 nm).

Measurement of weight average molecular weight: For each of the layer X before the light irradiation test, and the layer X after the light irradiation test, a weight average molecular weight is measured at a position of 70 mm inwardly from a lateral surface of the layer X.

Since the laminated glass according to the present invention has the above configuration, scorching in an end part of the laminated glass can be prevented. The laminated glass according to the present invention can prevent scorching in an end part of the laminated glass even when the interlayer film contains a heat shielding substance.

Recently, in automobiles, a laminated glass is more often used in the condition that an end part of the laminated glass is exposed. In the exposed end part of the laminated glass, discoloration due to scorching can occur more significantly.

Since the present invention is provided with the above configuration, scorching in an end part of the laminated glass cam be prevented even when the exposed end part of the laminated glass is exposed to the sunlight. For example, it is possible to prevent scorching of the laminated glass in the region to the position of 5 cm inwardly from a lateral surface of the laminated glass. In particular, it is possible to prevent scorching of the laminated glass in the region to the position of 1 cm inwardly from a lateral surface of the laminated glass.

In the light irradiation test, when the thickness of the layer X used in the laminated glass is more than 150 μm, a layer X having a thickness of 150 μm cut out from the layer X may be used. When the thickness of the layer X used in the laminated glass is 150 μm, the layer X itself may be used as a layer X having a thickness of 150 μm. When the thickness of the layer X used in the laminated glass is less than 150 μm, a layer X having a thickness of 150 μm prepared by laminating a plurality of layers X or cutout layers X may be used, or a layer X having a thickness of 150 μm may be prepared by press-molding a composition for forming layer X with a press molder.

The weight average molecular weight refers to a weight average molecular weight, calculated on the polystyrene equivalent basis, by gel permeation chromatography (GPC) measurement. For example, in order to determine a weight average molecular weight on the polystyrene equivalent basis, GPC measurement for a polystyrene standard sample having a known molecular weight is conducted. As the polystyrene standard sample ("Shodex Standard SM-105" available from SHOWA DENKO K.K.), samples having weight average molecular weights of 1,270, 3,180, 6,940, 21,800, 52,500, 139,000, 333,000, 609,000, 1,350,000, 2,700,000, and 3,900,000 are used. An approximate line obtained by plotting molecular weight with respect to elution time of a peak top of each standard sample is used as a calibration curve. A thermoplastic resin is dissolved in N-methyl-2-pyrrolidone (NMP) to prepare a solution of 0.1% by weight. A weight average molecular weight can be measured by analyzing the obtained solution with a GPC apparatus.

For example, as the GPC apparatus, a GPC apparatus (GPC 101 available from Shodex, "Ditector: RI-71S, column: one GPC LF-G (available from Shodex) and two GPC LF-804 (available from Shodex) are connected serially") is used. The weight average molecular weight can be analyzed by employing: moving bed: N-methylpyrrolidone to which 10 mM LiBr is added, flow speed 0.5 ml/min., column temperature 40° C., sample solution concentration: 0.2% by weight, injection amount: 100 μl.

The ratio (weight average molecular weight A before light irradiation test/weight average molecular weight B after light irradiation test) is preferably 1.9 or less, more preferably 1.8 or less, still more preferably 1.7 or less, further preferably 1.6 or less, still further preferably 1.5 or less, especially preferably 1.4 or less, more especially preferably 1.3 or less, most preferably 1.2 or less. When the ratio is the aforementioned upper limit or less, it is possible to further prevent scorching in an end part of the laminated glass. The ratio (weight average molecular weight A before light irradiation test/weight average molecular weight B after light irradiation test) is preferably 0.5 or more, more preferably 0.6 or more, still more preferably 0.7 or more, further preferably 0.8 or more, still further preferably 0.9 or more, especially preferably 1.0 or more. When the ratio is the aforementioned lower limit or more, it is possible to further prevent scorching in an end part of the laminated glass.

From the viewpoint of further preventing scorching in an end part of the laminated glass, the weight average molecular weight B after the light irradiation test is preferably 150000 or more, more preferably 200000 or more, further preferably 240000 or more, and is preferably 300000 or less, more preferably 290000 or less, further preferably 280000 or less.

As a method for making the ratio (weight average molecular weight A before light irradiation test/weight average molecular weight B after light irradiation test) be the aforementioned upper limit or less, the following method can be recited. Method of using a phenolic oxidation inhibitor not having a 2,6-di-t-butyl-phenol structure. Method of using a hindered amine light stabilizer in which an alkyl group or an alkoxy group is bonded to a nitrogen atom of the piperidine structure. Method of using an ultraviolet ray absorbing agent having a benzotriazole structure or an ultraviolet ray shielding agent having a triazine structure. However, when these ingredients are used, the aforementioned upper limit of the ratio (weight average molecular weight A before light irradiation test/weight average molecular weight B after light irradiation test) cannot be satisfied depending on the combination or amounts of the ingredients. In order to satisfy the aforementioned upper limit of the ratio (weight average molecular weight A before light irradiation test/weight average molecular weight B after light irradiation test), it is preferred to adjust the combination or amounts of these ingredients.

From the viewpoint of further heightening the sound insulating properties, the glass transition temperature of the layer X in the interlayer film is preferably 30° C. or less, more preferably 20° C. or less, further preferably 10° C. or less. The glass transition temperature of the layer X is preferably −15° C. or more.

The glass transition temperature is measured in the following manner.

The interlayer film is stored for 12 hours in an environment of 23±2° C. temperature, 25±5% humidity. Then, measurement is performed using "ARES-G2" available from TAINSTRUMENTS. In this connection, when the interlayer film is a single-layered interlayer film, the interlayer film is cut so as to have a diameter of 8 mm to be measured. A parallel plate with a diameter of 8 mm is used as a jig, and the measurement is performed under the condition in which the temperature is decreased from 100° C. to −30° C. at a temperature decreasing rate of 3° C./minute and under the condition of a frequency of 1 Hz and a strain of 1%. In the measurement results obtained, the peak temperature of the loss tangent is defined as the glass transition temperature Tg (° C.).

The lateral surface of the laminated glass means a lateral surface in the portion where the first glass plate and the second glass plate are opposed to each other. (See FIGS. 3(a), (b) and (c) illustrating laminated glass. The position of the broken line indicates a lateral surface of the laminated glass. Reference numerals: first glass plate 51, second glass plate 52, interlayer films 53A, 53B, 53C.)

Apart from the interlayer film body, it is sometimes the case that a covering part having a composition different from the composition of the interlayer film body is formed to cover the interlayer film body. In the case where the covering part that covers the interlayer film body is formed, the covering part is also included in the interlayer film when the covering part is aligned with the portion where the first glass plate and the second glass plate are opposed to each other, or the covering part is positioned inside the opposed part. In the laminated glass having this covering part, the ratio (weight average molecular weight A before light irradiation test/weight average molecular weight B after light irradiation test) is determined in the interlayer film including the covering part. In the laminated glass having the covering part, it can be mentioned that "there is a portion where a lateral surface of the interlayer film is exposed" by a lateral surface of the covering part. (See FIGS. 4(a) and (b)

illustrating laminated glass. Reference numeral: first glass plate 61, second glass plate 62, interlayer film body 63Aa, 63Ba (part of interlayer film), covering part 63Ab, 63Bb (part of interlayer film)).

In the case where the covering part that covers the interlayer film is formed, the covering part is not included in the interlayer film when the covering part has a part that protrudes laterally from the portion where the first glass plate and the second glass plate are opposed to each other. In the laminated glass having this covering part, the ratio (weight average molecular weight A before light irradiation test/weight average molecular weight B after light irradiation test) is determined in the interlayer film not including the covering part. In the laminated glass in which the entire lateral surface of the interlayer film is covered by the covering part (not being a part of the interlayer film), it cannot be mentioned that "there is a portion where a lateral surface of the interlayer film is exposed". (See FIGS. 5(*a*), (*b*) and (*c*) illustrating laminated glass. Reference numeral: first glass plate 71, second glass plate 72, interlayer film body 73A, 73B, 73Ca (part of interlayer film), covering part 73Cb (part of interlayer film), covering part 74A, 74B, 74C (not being a part of the interlayer film)).

When the interlayer film has a one-layer (first layer) structure, the layer being in contact with the glass plate is the interlayer film (first layer). When the interlayer film has a two-layer structure including a first layer and a second layer, the layer being in contact with the glass plate is the first layer and the second layer, namely, the first layer being in contact with the first glass plate and the second layer being in contact with the second glass plate. When the interlayer film has a three-layer structure including a second layer, a first layer and a third layer, the layer being in contact with the glass plate is the second layer and the third layer, namely, the second layer being in contact with the first glass plate and the third layer being in contact with the second glass plate. In the interlayer film having a two or more-layer structure, it is preferred that the interlayer film have the layer X as the first layer.

In the laminated glass, it is preferred that there be a portion where a lateral surface of the interlayer film is exposed. It is preferred that in an end part of the laminated glass, there be a portion where the lateral surface of the interlayer film is exposed. Scorching in an end part of the laminated glass can be prevented even when a lateral surface of the interlayer film is exposed. In the laminated glass, there may be a portion where a lateral surface of the interlayer film is not exposed. In an end part of the laminated glass, there may be a portion where a lateral surface of the interlayer film is exposed and a portion where a lateral surface of the interlayer film is not exposed.

From the viewpoint of heightening the transparency of the laminated glass, the visible light transmittance of the laminated glass is preferably 70% or more, more preferably 80% or more, further preferably 90% or more.

The visible light transmittance is measured at a wavelength ranging from 380 to 780 nm by using a spectrophotometer ("U-4100" available from Hitachi High-Tech Science Corporation) in conformity with JIS R3211:1998.

Hereinafter, specific embodiments of the present invention will be described with reference to the drawings.

FIG. 1 is a sectional view schematically showing laminated glass in accordance with a first embodiment of the present invention.

A laminated glass 11 shown in FIG. 1 includes a first glass plate 21, a second glass plate 22, and an interlayer film 1. The interlayer film 1 is arranged between the first glass plate 21 and the second glass plate 22, to be sandwiched therebetween.

The first glass plate 21 is layered on a first surface 1*a* of the interlayer film 1. The second glass plate 22 is layered on a second surface 1*b* opposite to the first surface 1*a* of the interlayer film 1. The first glass plate 21 is layered on an outer surface 3*a* of the second layer 3 of the interlayer film 1. The second glass plate 22 is layered on an outer surface 4*a* of the third layer 4 of the interlayer film 1.

The interlayer film 1 is a multi-layered interlayer film having a two or more-layer structure. The interlayer film 1 includes a first layer 2, the second layer 3 arranged on a first surface 2*a* side of the first layer 2, and a third layer 4 arranged on a second surface 2*b* side opposite to the first surface 2*a* of the first layer 2. The second layer 3 is layered on the first surface 2*a* of the first layer 2. The third layer 4 is layered on the second surface 2*b* of the first layer 2. The first layer 2 is an intermediate layer. Each of the second layer 3 and the third layer 4 is, for example, a protective layer and is a surface layer in the present embodiment. The first layer 2 is arranged between the second layer 3 and the third layer 4 to be sandwiched therebetween. Accordingly, the interlayer film 1 has a multilayer structure in which the second layer 3, the first layer 2, and the third layer 4 are arranged in this order. In the interlayer film 1, the second layer 3, the first layer 2, and the third layer 4 are arranged and layered in this order.

It is preferred that an outer surface on the opposite side of the first layer side of the second layer be a surface on which a glass plate is laminated. It is preferred that an outer surface on the opposite side of the first layer side of the third layer be a surface on which a glass plate is laminated.

In this connection, other layers may be arranged between the first layer 2 and the second layer 3 and between the first layer 2 and the third layer 4, respectively. It is preferred that the first layer 2 and the second layer 3, and the first layer 2 and the third layer 4 be directly layered. Examples of the other layer include layers containing a thermoplastic resin such as a polyvinyl acetal resin, and layers containing, for example, polyethylene terephthalate.

The interlayer film 1 contains a thermoplastic resin. The first layer 2 contains a thermoplastic resin. The second layer 3 contains a thermoplastic resin. The third layer 4 contains a thermoplastic resin.

FIG. 2 is a sectional view schematically showing laminated glass in accordance with a second embodiment of the present invention.

A laminated glass 41 shown in FIG. 2 includes a first glass plate 21, a second glass plate 22, and an interlayer film 31. The interlayer film 31 is arranged between the first glass plate 21 and the second glass plate 22, to be sandwiched therebetween. The first glass plate 21 is layered on a first surface 31*a* of the interlayer film 31. The second glass plate 22 is layered on a second surface 31*b* opposite to the first surface 31*a* of the interlayer film 31.

The interlayer film 31 is a single-layered interlayer film having a one-layer structure. The interlayer film 31 is a first layer. The interlayer film 31 contains a thermoplastic resin.

The interlayer film has a one-layer structure or a two or more-layer structure. The interlayer film may have a one-layer structure and may have a two or more-layer structure. The interlayer film may have a two-layer structure and may have a three or more-layer structure. The interlayer may be an interlayer film having a one-layer structure including only a first layer (single-layered interlayer film) and may be an interlayer film having two or more-layer structure including a first layer and other layer (multi-layered interlayer film).

Hereinafter, the details of the first layer (including a single-layered interlayer film), the second layer, and the third layer which constitute the interlayer film, and the details of each ingredient contained in the first layer, the second layer, and the third layer will be described.

(Thermoplastic Resin)

The interlayer film contains a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). The layer X contains a thermoplastic resin (hereinafter, sometimes described as a thermoplastic resin (X)). It is preferred that the layer X contain a polyvinyl acetal resin (hereinafter, sometimes described as a polyvinyl acetal resin (X)) as the thermoplastic resin (X). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (X), the thermoplastic resin (1), the thermoplastic resin (2), and the thermoplastic resin (3) may be used alone and two or more kinds thereof may be used in combination. One kind of each of the polyvinyl acetal resin (0), the thermoplastic resin (X), the polyvinyl acetal resin (1), the polyvinyl acetal resin (2), and the polyvinyl acetal resin (3) may be used alone and two or more kinds thereof may be used in combination.

The thermoplastic resin (X) in the layer X may be a part of the thermoplastic resin (0) or may be the whole of the thermoplastic resin (0). The thermoplastic resin (X) in the layer X may be a polyvinyl acetal resin (0) as will be described later. The layer X may be the first layer, and the thermoplastic resin in the layer X may be the thermoplastic resin (1) or may be the polyvinyl acetal resin (1).

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

The thermoplastic resins exemplified above can be a thermoplastic elastomer by adjusting the molecular structure, the polymerization degree and the like of the resin.

The thermoplastic resin means a resin that softens and exhibits plasticity when it is heated, and hardens when it is cooled to room temperature (25° C.). Among the thermoplastic resins, especially the thermoplastic elastomer means a resin that softens and exhibits plasticity when it is heated, and hardens to exhibits rubber elasticity when it is cooled to room temperature (25° C.).

From the viewpoint of further preventing scorching in an end part of the laminated glass, it is preferred that the thermoplastic resin be a polyvinyl acetal resin, an ionomer resin or an ethylene-vinyl acetate copolymer resin, or the thermoplastic resin be a thermoplastic elastomer. It is preferred that the thermoplastic resin (1) in the first layer be a preferred thermoplastic resin as described above. It is preferred that each of thermoplastic resin (2) in the second layer and the thermoplastic resin (2) in the second layer be a preferred thermoplastic resin as described above. In this case, the thermoplastic resin is a polyvinyl acetal resin, an ionomer resin or an ethylene-vinyl acetate copolymer resin, and the thermoplastic resin may be a thermoplastic elastomer. The thermoplastic resin may be a polyvinyl acetal resin, an ionomer resin or an ethylene-vinyl acetate copolymer resin, and the thermoplastic resin may be a thermoplastic elastomer. It is preferred that the thermoplastic resin in the layer X be a polyvinyl acetal resin, an ionomer resin or an ethylene-vinyl acetate copolymer resin, or the thermoplastic resin in the layer X be a thermoplastic elastomer.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

From the viewpoint of further preventing scorching in an end part of the laminated glass, it is preferred that the interlayer film contain a polyvinyl butyral resin or an ionomer resin. From the viewpoint of further preventing scorching in an end part of the laminated glass, it is preferred that the polyvinyl acetal resin be a polyvinyl butyral resin. From the viewpoint of further preventing scorching in an end part of the laminated glass, the ionomer resin be a polyvinyl acetal ionomer resin.

The polyvinyl acetal ionomer resin is an ionomerized polyvinyl acetal resin. It is preferred that the polyvinyl acetal ionomer resin contain polyvinyl acetal into which an acid group is introduced.

The polyvinyl acetal ionomer resin has, for example, a $-CH_2-CH-$ group in a main chain. The polyvinyl acetal ionomer resin has a polyvinyl acetal skeleton. The polyvinyl acetal skeleton has a $-CH_2-CH-$ group in a main chain. To the carbon atom in the "$-CH-$" moiety in a $-CH_2-CH-$ group, another group is bound. In the polyvinyl acetal ionomer resin, it is preferred that $-CH_2-CH-$ groups be consecutive in the main chain.

For neutralization in obtaining the polyvinyl acetal ionomer resin, metal is used. From the viewpoint of effectively heightening the shock resistance at low temperature and the self-repairability, the metal is preferably Na, Li, K, Mg, Zn, Cu, Co, Al, Fe, Ni, Cr or Mn. It is preferred that the metal contain, in particular, Na.

Examples of the method for producing the polyvinyl acetal ionomer resin include the following method. Method of copolymerizing polyvinyl acetate and a monomer having a group capable of becoming an ionic functional group, saponifying, and acetalizing with aldehyde, followed by ionomerization. Method of acetalizing polyvinyl alcohol (PVA) with an aldehyde having a group capable of becoming an ionic functional group, followed by ionomerization. Method of acetalizing polyvinyl acetal with an aldehyde having a group capable of becoming an ionic functional group, followed by ionomerization.

Examples of the method for ionomerization include a method of adding a metal-containing compound into a solution, and a method of adding a metal-containing compound during kneading. The metal-containing compound may be added in a state of a solution.

It is preferred that the ionic functional group be a carboxyl group, a base of carboxyl group, a sulfonic acid group, a base of sulfonic acid group, a sulfinic acid group, a base of sulfinic acid group, a sulfenic acid group, a base of sulfenic acid group, a phosphoric acid group, a base of phosphoric acid group, a phosphonic acid group, a base of phosphonic acid group, an amino group, or a base of amino group. In this case, the effect of ionomerization effectively appears.

From the viewpoint of effectively heightening the shock resistance at low temperature and the self-repairability, the polyvinyl acetal ionomer resin has a content of the ionic functional group of preferably 20% by mole or less, more preferably 10% by mole or less, further preferably 5% by mole or less.

The content of the ionic functional group means a sum of a percentage of the group that can become an ionic functional group in the resin, and a percentage of the ionic functional group constituting the metal salt of the ionic functional group. The content of the ionic functional group can be determined by using NMR or the like. For example, the content of the ionic functional group can be calculated from an integrated value of the peak originated from the ionic functional group (appearing around 45 ppm in the carboxyl group) and the peak originated from the main chain appearing around 30 ppm in carbon NMR.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further heightening the sound insulating properties, it is preferred that the content of the hydroxyl group of the polyvinyl acetal resin (1) be lower than the content of the hydroxyl group of the polyvinyl acetal resin (3). From the viewpoint of still further heightening the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further heightening the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. The absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

Preferred examples of the polyvinyl acetal resin in the layer X include resins equivalent to the polyvinyl acetal resin (1) (resins in which a content of the hydroxyl group, an acetylation degree and an acetalization degree are equivalent to those of the polyvinyl acetal resin (1)).

(Plasticizer)

From the viewpoint of further heightening the adhesive force of an interlayer film, it is preferred that the interlayer film contain a plasticizer (hereinafter, sometimes described as a plasticizer (0)). It is preferred that the layer X contain a plasticizer (hereinafter, sometimes described as a plasticizer (X)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

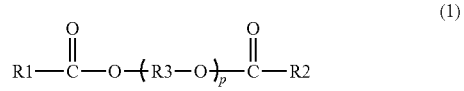

In the foregoing formula (1), R1 and R2 each represent an organic group with 5 to 10 carbon atoms, R3 represents an ethylene group, an isopropylene group, or a n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film, the content of the plasticizer (0) relative to 100 parts by weight of the thermoplastic resin (0) is referred to as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the layer X, the content of the plasticizer (X) relative to 100 parts by weight of the thermoplastic resin (X) is referred to as content (X). The content (X) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (X) is the above lower limit or more, the flexibility of the interlayer film is enhanced and the handling of the interlayer film is facilitated. When the content (X) is the above upper limit or less, the penetration resistance of laminated glass is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3).

From the viewpoint of further enhancing the sound insulating properties of laminated glass, each of the absolute value of difference between the content (2) and the content (1) and the absolute value of difference between the content (3) and the content (1) is preferably 10 parts by weight or more, more preferably 15 parts by weight or more, further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film contain a heat shielding substance (heat shielding compound). It is preferred that the layer X contain a heat shielding substance. It is preferred that the first layer contain a heat shielding substance. It is preferred that the second layer contain a heat shielding substance. It is preferred that the third layer contain a heat shielding substance. When the interlayer film contains a heat shielding substance, discoloration due to scorching tends to be more likely to occur. In the laminated glass having the configuration of the present invention, however, discoloration due to scorching can be prevented even though the interlayer film contains a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

Ingredient X:

It is preferred that the interlayer film include at least one kind of Ingredient X among a phthalocyanine compound, a naphthalocyanine compound, and an anthracyanine compound. It is preferred that the layer X contain the Ingredient X. It is preferred that the first layer contain the Ingredient X. It is preferred that the second layer contain the Ingredient X. It is preferred that the third layer contain the Ingredient X. The Ingredient X is a heat shielding substance. When the interlayer film contains the Ingredient X, discoloration due to scorching tends to be more likely to occur. In the laminated glass having the configuration of the present invention, however, discoloration due to scorching can be prevented even though the interlayer film contains the Ingredient X. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a layer having a lowest glass transition temperature, a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a layer having a lowest glass transition temperature, a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the layer X contain the heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. When the interlayer film contains the heat shielding particles, discoloration due to scorching tends to be more likely to occur. In the laminated glass having the configuration of the present invention, however, discoloration due to scorching can be prevented even though the interlayer film contains the heat shielding particles. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a layer having a lowest glass transition temperature, a first layer, a second layer, or a third layer), the content of the heat shielding particles is preferably 0.01% by weight or more, more preferably 0.1% by weight or more, further preferably 1% by weight or more, especially preferably 1.5% by weight or more. In 100% by weight of the interlayer film, or in 100% by weight of a layer containing the heat shielding particles (a layer having a lowest glass transition temperature, a first layer, a second layer, or a third layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the layer X contain the Metal salt M. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a layer having a lowest glass transition temperature, a first layer, a second layer, or a third layer) is preferably 5 ppm or more, more preferably 10 ppm or more, and further preferably 20 ppm or more. The total of the contents of Mg and K in an interlayer film containing the Metal salt M or a layer containing the Metal salt M (a layer having a lowest glass transition temperature, a first layer, a second layer, or a third layer) is preferably 300 ppm or less, more preferably 250 ppm or less, further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the layer X contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and 2-[4,6-bis(2,4-dimethylphenyl)-1,3,5-triazin-2-yl]-5-(octyloxy)phenol ("UV-1164" available from SUN CHEMICAL COMPANY LTD.).

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further preventing scorching in an end part of the laminated glass, an ultraviolet ray shielding agent having a benzotriazole structure or an ultraviolet ray shielding agent having a triazine structure is preferred. By using these preferred ultraviolet ray shielding agents, the ratio (weight average molecular weight A before light irradiation test/weight average molecular weight B after light irradiation test) is more likely to be the aforementioned upper limit or less.

As the ultraviolet ray shielding agent having a benzotriazole structure, 2-(2'-hydroxy-3'-t-butyl-5-methylphenyl)-5-chlorobenzotriazole ("Tinuvin326" available from BASF Japan Ltd.) is especially preferred. As the ultraviolet ray shielding agent having a triazine structure, 2-[4,6-bis(2,4-dimethylphenyl)-1,3,5-triazine-2-yl]-5-(octyloxy)phenol ("UV-1164" available from SUNCHEMICAL CO., LTD.) is especially preferred.

In 100% by weight of a layer containing the ultraviolet ray screening agent (a layer having a lowest glass transition temperature, a first layer, a second layer, or a third layer), the content of the ultraviolet ray screening agent is preferably 0.1% by weight or more, more preferably 0.2% by weight or more, further preferably 0.3% by weight or more, especially preferably 0.5% by weight or more. In 100% by weight of a layer containing the ultraviolet ray screening agent (a layer having a lowest glass transition temperature, a first layer, a second layer, or a third layer), the content of the ultraviolet ray screening agent is preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period is further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the layer X contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl R-(3,5-di-t-butyl-4-hydroxyphenyl)propionate, 2,2'-methylenebis-(4-methyl-6-t-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and "ADK STAB AO-40" available from ADEKA CORPORATION.

From the viewpoint of further preventing scorching in an end part of the laminated glass, a phenolic oxidation inhibitor not having a 2,6-di-t-butyl-phenol structure is especially preferred as the oxidation inhibitor. By using this preferred oxidation inhibitor, the ratio (weight average molecular weight A before light irradiation test/weight average molecular weight B after light irradiation test) is more likely to be the aforementioned upper limit or less.

As the phenolic oxidation inhibitor not having a 2,6-di-t-butyl-phenol structure, 4,4'-butylidene-bis-(3-methyl-6-t-butylphenol), and bis(3-t-butyl-4-hydroxy-5-methylbenzenepropanoic acid)ethylene bis(oxyethylene) are especially preferred. The 4,4'-butylidene-bis-(3-methyl-6-t-butylphenol) is commercially available as "IRGANOX 245" available from BASF Japan Ltd. The bis(3-t-butyl-4-hydroxy-5-methylbenzenepropanoic acid)ethylene bis(oxyethylene) is available as "ADK STAB AO-40" from ADEKA CORPORATION.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a layer having a lowest glass transition temperature, a first layer, a second layer, or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Light Stabilizer)

It is preferred that the interlayer film contain a light stabilizer. It is preferred that the layer X contain a light stabilizer. It is preferred that the first layer contain a light stabilizer. It is preferred that the second layer contain a light stabilizer. It is preferred that the third layer contain a light stabilizer. By using the light stabilizer, discoloration is further suppressed and the visible light transmittance is less likely to lower even when the interlayer film is used over a long term or exposed to sunlight. One kind of the light stabilizer may be used alone and two or more kinds thereof may be used in combination.

From the viewpoint of further suppressing the discoloration, it is preferred that the light stabilizer be a hindered amine light stabilizer.

Examples of the hindered amine light stabilizer include hindered amine light stabilizers in which an alkyl group, an alkoxy group or a hydrogen atom is bonded to a nitrogen atom of the piperidine structure. From the viewpoint of further suppressing the discoloration, a hindered amine light stabilizer in which an alkyl group or an alkoxy group is bonded to a nitrogen atom of the piperidine structure is preferred. The hindered amine light stabilizer is preferably a hindered amine light stabilizer in which an alkyl group is bonded to a nitrogen atom of the piperidine structure, and also preferably a hindered amine light stabilizer in which an alkoxy group is bonded to a nitrogen atom of the piperidine structure.

As the hindered amine light stabilizer in which an alkyl group is bonded to a nitrogen atom of the piperidine structure, "Tinuvin 765" and "Tinuvin 622SF" available from BASF, and "ADK STAB LA-52" available from ADEKA, or the like can be recited.

As the hindered amine light stabilizer in which an alkoxy group is bonded to a nitrogen atom of the piperidine structure, "Tinuvin XT-850FF" and "Tinuvin XT-855FF" available from BASF, and "ADK STAB LA-81" available from ADEKA, or the like can be recited.

As the hindered amine light stabilizer in which a hydrogen atom is bonded to a nitrogen atom of the piperidine structure, "Tinuvin 770DF" available from BASF, and "Hostavin N24" available from Clariant, or the like can be recited.

From the viewpoint of further suppressing the discoloration, the light stabilizer has a molecular weight of preferably 2000 or less, more preferably 1000 or less, further preferably 700 or less.

From the viewpoint of further preventing scorching in an end part of the laminated glass, a hindered amine light stabilizer in which an alkyl group or an alkoxy group is bonded to a nitrogen atom of the piperidine structure is preferred as the light stabilizer. By using these preferred light stabilizers, the ratio (weight average molecular weight A before light irradiation test/weight average molecular weight B after light irradiation test) is more likely to be the aforementioned upper limit or less.

In 100% by weight of the interlayer film or in 100% by weight of a layer containing the light stabilizer (a layer having a lowest glass transition temperature, a first layer, a second layer, or a third layer), the content of the light stabilizer is preferably 0.0025% by weight or more, more preferably 0.025% by weight or more, and is preferably 0.5% by weight or less, more preferably 0.3% by weight or less. When the content of the light stabilizer is the above lower limit or more and the above upper limit or less, discoloration is efficiently suppressed.

(Other Ingredients)

Each of the interlayer film, the layer X, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film)

The distance between one end and the other end of the interlayer film is preferably 0.5 m or more, more preferably 0.8 m or more, and especially preferably 1 m or more, and is preferably 3 m or less, more preferably 2 m or less, and especially preferably 1.5 m or less. When the interlayer film has a lengthwise direction and a widthwise direction, the distance between one end and the other end is the distance in the lengthwise direction of the interlayer film. When the interlayer film has a square planar shape, the distance between one end and the other end is a distance between one end and the other end that are opposed to each other.

From the viewpoint of further improving the sound insulating properties of laminated glass when the interlayer film has a two or more-layer structure or a three or more-layer structure, the glass transition temperature of the first layer is preferably 30° C. or less, more preferably 20° C. or less, further preferably 10° C. or less. The glass transition temperature of the first layer is preferably −15° C. or more.

The thickness of the interlayer film is not particularly limited. From the viewpoint of the practical aspect and the viewpoint of sufficiently heightening the heat shielding property, the thickness of the interlayer film is preferably 0.1 mm or more, and more preferably 0.25 mm or more and is preferably 3 mm or less, and more preferably 1.5 mm or less. When the thickness of the interlayer film is the above-described lower limit or more, the penetration resistance of laminated glass is enhanced. When the thickness of the interlayer film is the above upper limit or less, the transparency of the interlayer film is further improved.

The thickness of the interlayer film is designated as T. From the viewpoint of further preventing scorching in an end part of the laminated glass in the case of a multi-layered interlayer film, the thickness of the first layer is preferably 0.0625 T or more, more preferably 0.1 T or more, and is preferably 0.375 T or less, more preferably 0.25 T or less.

From the viewpoint of further preventing scorching in an end part of the laminated glass in the case of a multi-layered interlayer film, the thickness of the layer A is preferably 0.0625 T or more, more preferably 0.1 T or more, and is preferably 0.375 T or less, more preferably 0.25 T or less.

From the viewpoint of further preventing scorching in an end part of the laminated glass, the thickness of each of the second layer and the third layer is preferably 0.625 T or more, more preferably 0.75 T or more, and is preferably 0.9375 T or less, more preferably 0.9 T or less. When the thickness of each of the second layer and the third layer is the above-described lower limit or more and the above-described upper limit or less, bleeding out of the plasticizer can be suppressed.

From the viewpoint of further preventing scorching in an end part of the laminated glass, a total thickness of the second layer and the third layer is preferably 0.625 T or more, more preferably 0.75 T or more, and is preferably 0.9375 T or less, more preferably 0.9 T or less when the interlayer film includes the second layer and the third layer. When the total thickness of the second layer and the third layer is the above-described lower limit or more and the above-described upper limit or less, bleeding out of the plasticizer can be suppressed.

The interlayer film may be an interlayer film having a uniform thickness, or may be an interlayer film having varying thickness. The sectional shape of the interlayer film may be a rectangular shape and may be a wedge-like shape.

The method for producing the interlayer film is not particularly limited. In the case of a single-layered interlayer film, examples of the production method of the interlayer film include a method of extruding a resin composition with an extruder. In the case of a multi-layered interlayer film, examples of the production method of the interlayer film include a method of separately forming respective resin compositions used for constituting respective layers into respective layers, and then layering the respective obtained layers, a method of coextruding respective resin compositions used for constituting respective layers with an extruder and layering the respective layers, and the like. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method. The emboss roll method is preferred because a large number of embosses of the protrusions and recesses, which is a quantitatively constant protrusions and recesses pattern, can be formed.

(Other Details of Laminated Glass)

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

In the present invention, at least one of the first glass plate and the second glass plate is a heat ray absorbing plate glass conforming to JIS R3208:1998.

From the viewpoint of further preventing scorching in an end part of the laminated glass, the solar transmittance of the heat ray absorbing plate glass is preferably 69% or less, more preferably 68% or less, further preferably 65% or less, especially preferably 63% or less.

The solar transmittance Ts at a wavelength of 300 to 2100 nm (Ts2100) can be determined in conformity with JIS R3106:1998 by using a spectrophotometer ("U-4100" available from Hitachi High-Tech Science Corporation).

The thickness of each of the first glass plate and the second glass plate is preferably 0.5 mm or more, more preferably 1 mm or more. Each of the first glass plate and the second glass plate has a thickness of 1.9 mm or less.

The Tts of the laminated glass measured in conformity with ISO 13837 is preferably 62% or less, more preferably 60% or less, further preferably 58% or less, especially preferably 56% or less.

It is preferred that Tts of the first glass plate measured in conformity with ISO 13837 and Tts of the second glass plate measured in conformity with ISO 13837 be different from each other. In this case, by disposing the laminated glass so that the side of the glass plate having a lower Tts is the outdoor air side, it is possible to further prevent scorching in an end part of the laminated glass.

Tts can be calculated by measuring the transmittance/reflectance at a wavelength of 300 to 2500 nm in conformity with ISO 13837 by using a spectrophotometer ("U-4100" available from Hitachi High-Tech Science Corporation).

The method for producing the laminated glass is not particularly limited. First, the interlayer film is sandwiched between the first glass plate and the second glass plate to obtain a laminate. Then, for example, by passing the obtained laminate through pressure rolls or subjecting the obtained laminate to decompression suction in a rubber bag, the air remaining between the first glass plate and the second glass plate, and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150° C. and under a pressure of 1 to 1.5 MPa. In this way, laminated glass can be obtained.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is used for obtaining laminated glass of an automobile.

In the present invention, since it is possible to prevent scorching in an end part of the laminated glass, it is preferred that the laminated glass be used as side glass, roof glass or glass for backlight in automobiles. The side glass is easy to visually recognize. The quality of the roof glass is easily altered by the sunlight or the like. Regarding the glass for backlight, a defect in appearance is easily recognized by backlight. By using the laminated glass according to the present invention as side glass, roof glass or glass for backlight, scorching is less likely to occur, and excellent appearance can be maintained. It is preferred that the laminated glass be used as glass for windshield in automobiles.

In the portion where the lateral surface of the interlayer film is exposed in the laminated glass, it is preferred that black coating be not applied on the adhesion surface between an end part of the interlayer film and an end part of the glass plate on the exterior side. In the portion where the lateral surface of the interlayer film is exposed in the laminated glass, it is preferred that black coating be not applied on the adhesion surface between an end part of the interlayer film and an end part of the first glass plate. In the portion where the lateral surface of the interlayer film is exposed in the laminated glass, it is preferred that black coating be not applied on the adhesion surface between an end part of the interlayer film and an end part of the second glass plate. It is preferred that black coating be not applied on the adhesion surface in the region up to the position of 0.5 mm inwardly from the lateral surface of the interlayer film. It is more preferred that black coating be not applied on the adhesion surface in the region up to the position of 1 cm inwardly from the lateral surface of the interlayer film. It is further preferred that black coating be not applied on the adhesion surface in the region up to the position of 5 cm inwardly from the lateral surface of the interlayer film. When black coating is not applied, scorching tends to easily occur in an end part of the laminated glass. With the configuration of the present invention, it is possible to sufficiently prevent scorching in an end part of the laminated glass even when black coating is not applied.

Hereinafter, the present invention will be described in more detail with reference to examples and comparative examples. The present invention is not limited only to these examples.

With regard to the polyvinyl butyral resin (PVB) used in the following examples and comparative examples, the butyralization degree (the acetalization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

In Examples and Comparative Examples, the following ingredients were used.

The following heat shielding particles were used.
ITO (ITO particles, available from Mitsubishi Materials Corporation)

The following oxidation inhibitors were used.
IRGANOX245: "IRGANOX 245" available from BASF Japan Ltd.
"ADK STAB AO-40" available from ADEKA CORPORATION, "AO-40" in Tables
IRGANOX1010: "IRGANOX 1010" available from BASF Japan Ltd.

The following light stabilizers were used.
"Tinuvin765" available from BASF Japan Ltd.
"Tinuvin123" available from BASF Japan Ltd.

Example 1

Preparation of Composition for Forming Interlayer Film:

The following ingredients were mixed, and kneaded sufficiently with a mixing roll to obtain a composition for forming an interlayer film.

Polyvinyl acetal resin (11) (an average polymerization degree of 1700, a butyralization degree of 69% by mole, an acetylation degree of 1% by mole, a content of the hydroxyl group of 30% by mole) 100 parts by weight 40 parts by weight of triethylene glycol di-2-ethylhexanoate (3GO) which is a plasticizer An amount that is to be 0.2% by weight in the obtained interlayer film of an ultraviolet ray screening agent (2-(2'-hydroxy-3'-t-butyl-5-methylphenyl)-5-chlorobenzotriazole)

An oxidation inhibitor ("ADK STAB AO-40" from ADEKA CORPORATION) in an amount of 0.4% by weight in the obtained interlayer film An amount that is to be a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

By extruding a composition for forming an interlayer film with an extruder, a single-layered interlayer film (thickness: 760 μm) was prepared.

Preparation of Laminated Glass:

The obtained interlayer film was cut out into a piece of 8 cm long x 8 cm wide. Then interlayer film was sandwiched between the first glass plate and the second glass plate (8 cm long x 7 cm wide) shown in Table 1, and vacuum-pressed by retention at 90° C. for 30 minutes with a vacuum laminator, to obtain a laminate. In the laminate, the part of the interlayer film protruding from the glass plate was cut off, to obtain laminated glass.

Examples 2 to 8 and Comparative Examples 1 to 4

A laminated glass was obtained in the same manner as that in Example 1 except that the amounts and the kinds of the ingredients, and the kinds of the first, second glass plates were changed to those shown in the following Tables 1, 2. In the interlayer film containing a light stabilizer, and a heat shielding substance, the light stabilizer and the heat shielding substance were used in such amounts that satisfy the amounts described in the following Table 2 in the obtained second layer and third layers.

Example 9

Preparation of Composition for Forming First Layer:

The following ingredients were mixed, and kneaded sufficiently with a mixing roll to obtain a composition for forming a first layer.

Polyvinyl acetal resin (12) (an average polymerization degree of 3000, a butyralization degree of 65% by mole, an acetylation degree of 12% by mole, a content of the hydroxyl group of 23% by mole) 100 parts by weight 60 parts by weight of triethylene glycol di-2-ethylhexanoate (3GO) which is a plasticizer ITO particles in an amount of 0.16% by weight in the obtained first layer An amount that is to be 0.2% by weight in the obtained first layer of an ultraviolet ray screening agent (2-(2'-hydroxy-3'-t-butyl-5-methylphenyl)-5-chlorobenzotriazole)

An oxidation inhibitor ("ADK STAB AO-40" from ADEKA CORPORATION) in an amount of 0.4% by weight in the obtained first layer Preparation of Composition for Forming Second Layer and Third Layer:

The following ingredients were mixed, and kneaded sufficiently with a mixing roll to obtain a composition for forming a second layer and a third layer.

Polyvinyl acetal resin (11) (an average polymerization degree of 1700, a butyralization degree of 69% by mole, an acetylation degree of 1% by mole, a content of the hydroxyl group of 30% by mole) 100 parts by weight 40 parts by weight of triethylene glycol di-2-ethylhexanoate (3GO) which is a plasticizer ITO particles in an amount of 0.16% by weight in the obtained second layer and fourth layer An ultraviolet ray screening agent (2-(2'-hydroxy-3'-t-butyl-5-methylphenyl)-5-chlorobenzotriazole) in an amount of 0.2% by weight in the obtained second layer and third layer An oxidation inhibitor ("ADK STAB AO-40" from ADEKA CORPORATION) in an amount of 0.4% by weight in the obtained second layer and third layer An amount that is to be a metal element concentration (Mg concentration) of 70 ppm in the obtained second layer and third layer of a Mg mixture (50:50 (weight ratio) mixture of magnesium 2-ethylbutyrate and magnesium acetate)

Preparation of Interlayer Film:

By coextruding the composition for forming a first layer and the composition for forming a second layer and a third layer using a coextruder, a three-layer interlayer film (a second layer: 380 μm thick/a first layer: 100 μm thick/a third layer: 375 μm thick) was prepared.

Examples 10 to 12 and Comparative Examples 5, 6

A laminated glass was obtained in the same manner as that in Example 9 except that the amounts and the kinds of the ingredients, thickness of each layer, and the kinds of the first, second glass plates were changed to those shown in the following Table 3. The light irradiation test was performed in the same manner as that in Example 9. In the interlayer film containing a light stabilizer, the light stabilizer was used in such amounts that satisfy the amounts described in the following Table 3 in the obtained first layer, second layer and third layer.

(Evaluation)
(1) Measurement of Dynamic Viscoelasticity

The obtained interlayer film was stored for 12 hours in an environment at room temperature of 23±2° C. and a humidity of 25±5%. Then, dynamic viscoelasticity was measured by using a dynamic viscoelasticity measuring apparatus ("ARES-G2" available from TA Instruments, Inc.). Glass transition temperature was determined by measuring dynamic viscoelasticity with a parallel plate having a diameter of 8 mm as a jig, at a shear mode under the condition in which the temperature is decreased from 100° C. to −30° C. at a temperature decreasing rate of 3° C./minute and under the condition of a frequency of 1 Hz and a strain of 1%, and the layer having the lowest glass transition temperature was defined as a layer X. In Examples 1 to 8 and Comparative Examples 1 to 4, the interlayer film itself was defined as a layer X because the interlayer film had a one-layer structure.

(2) Ratio (Weight Average Molecular Weight a Before Light Irradiation Test/Weight Average Molecular Weight B after Light Irradiation Test).

Light Irradiation Test:

In Examples 1 to 8, and Comparative Examples 1 to 4, the layer X in the interlayer film was cut out, to obtain a layer X before the light irradiation test having a thickness of 150 μm. In Examples 9 to 12 and Comparative Examples 5, 6, a composition for forming the first layer was extruded to have a thickness of 150 μm with an extruder, to obtain a layer X before the light irradiation test. A first light irradiation test that irradiates the layer X having a thickness of 150 μm with xenon light at a black panel temperature of 63° C., a temperature inside the vessel of 50° C. and a humidity of 50% RH for 150 hours was performed to obtain a layer X after the light irradiation test. The irradiation with xenon light was conducted with an irradiance of 60 W/m², a wavelength for measuring the irradiance of 300 to 400 nm, an inner filter of quartz, and an outer filter of quartz: #275 (cutoff 275 nm).

Measurement of Weight Average Molecular Weight:

For each of the layer X before the light irradiation test, and the layer X after the light irradiation test, a weight average molecular weight was measured at a position of 70 mm inwardly from a lateral surface of the layer X.

A weight average molecular weight A of the thermoplastic resin in the layer X before the light irradiation test was determined. A weight average molecular weight B of the thermoplastic resin in the layer X after the light irradiation test was determined.

A ratio (weight average molecular weight A before light irradiation test/weight average molecular weight B after light irradiation test) was judged according to the following criteria.

[Evaluation Criteria for Ratio (Weight Average Molecular Weight a Before Light Irradiation Test/Weight Average Molecular Weight B after Light Irradiation Test)]

∘∘: Ratio (weight average molecular weight A before light irradiation test/weight average molecular weight B after light irradiation test) is 1.6 or less.

∘: Ratio (weight average molecular weight A before light irradiation test/weight average molecular weight B after light irradiation test) is more than 1.6 and 2.0 or less.

x: Ratio (weight average molecular weight A before light irradiation test/weight average molecular weight B after light irradiation test) is more than 2.0.

(3) Scorching in End Part of Laminated Glass

In preparing a laminated glass, black coating was applied with a black spray ("2-component urethane spray" available from Asahipen Corporation) on the surface of the end part of the glass plate on which the interlayer film is laminated, positioned on the side opposite to the side irradiated with xenon light. The black coating was performed in an end part of the interlayer film. The coating was performed so that the visible light transmittance of the glass plate in the black coated part was 1% or less. Then, a thermal insulation sheet having a thickness of 6 mm (Product name: Thick thermal insulation sheet, product number 78-1078-20, available from ESCO Co., Ltd.) was bonded with the black coated surface of the glass plate, to obtain a laminated glass for examining scorching in an end part of the laminated glass.

A second light irradiation test that irradiates with xenon light at a black panel temperature of 83° C., a temperature inside the vessel of 53° C. and a humidity of 50% RH for 200 hours was performed. The irradiation with xenon light was conducted with an irradiance of 180 W/m², a wavelength for measuring the irradiance of 300 to 400 nm, an inner filter of quartz, and an outer filter of quartz: #275 (cutoff 275 nm).

After the second light irradiation test, scorching in an end part of the laminated glass was judged according to the following criteria.

[Scorching in End Part of Laminated Glass]

∘∘: Scorching and thus discoloration do not occur in end part of laminated glass.

∘: Slight discoloration that cannot be mentioned as scorching occurs in end part of laminated glass, but sufficiently transparency is kept.

x: Scorching occurs in end part of laminated glass.

The details and the results are shown in the following Tables 1 to 3.

TABLE 1

| | | | Example 1 | Example 2 | Example 3 | Example 4 |
|---|---|---|---|---|---|---|
| Configuration of laminated glass | First glass plate | Kind | Heat ray absorbing plate glass | Heat ray absorbing plate glass | Heat ray absorbing plate glass | Heat ray absorbing plate glass |
| | | Thickness (mm) | 1.9 | 1.9 | 1.9 | 1.9 |
| | | Solar transmittance (%) | 62 | 62 | 62 | 62 |
| | Second glass plate | Kind | Green glass | Green glass | Green glass | Heat ray absorbing plate glass |
| | | Thickness (mm) | 1.5 | 1.5 | 1.5 | 1.9 |
| | | Solar transmittance (%) | 70 | 70 | 70 | 62 |
| | Configuration of interlayer film | Kind of heat shielding substance | — | — | — | — |
| | | Amount of heat shielding substance (% by weight) | — | — | — | — |

TABLE 1-continued

|  |  |  | AO-40 | IRGANOX245 | IRGANOX1010 | IRGANOX1010 |
|---|---|---|---|---|---|---|
|  |  | Kind of oxidation inhibitor |  |  |  |  |
|  |  | Amount of oxidation inhibitor (% by weight) | 0.4 | 0.4 | 0.4 | 0.4 |
|  |  | Kind of light stabilizer | — | — | Tinuvin123 | Tinuvin765 |
|  |  | Amount of light stabilizer (% by weight) | — | — | 0.05 | 0.05 |
|  |  | Glass transition temperature (° C.) | 28 | 28 | 28 | 28 |
|  | Tts of laminated glass (%) |  | 61 | 61 | 61 | 58 |
|  | Visible light transmittance of laminated glass (%) |  | 76 | 76 | 76 | 72 |
| Evaluation | (1) Ratio (weight average molecular weight A before light irradiation test/weight average molecular weight B after light irradiation test) |  | ○ | ○ | ○○ | ○○ |
|  | (2) Scorching in end part of laminated glass |  | ○ | ○ | ○○ | ○○ |

|  |  |  |  | Comparative Example 1 | Comparative Example 2 |
|---|---|---|---|---|---|
| Configuration of laminated glass | First glass plate | Kind | Clear glass | Green glass |
|  |  | Thickness (mm) | 2.5 | 1.9 |
|  |  | Solar transmittance (%) | 82 | 70 |
|  | Second glass plate | Kind | Clear glass | Green glass |
|  |  | Thickness (mm) | 2.5 | 1.9 |
|  |  | Solar transmittance (%) | 82 | 70 |
|  | Configuration of interlayer film | Kind of heat shielding substance | — | — |
|  |  | Amount of heat shielding substance (% by weight) | — | — |
|  |  | Kind of oxidation inhibitor | IRGANOX1010 | IRGANOX1010 |
|  |  | Amount of oxidation inhibitor (% by weight) | 0.4 | 0.4 |
|  |  | Kind of light stabilizer | — | — |
|  |  | Amount of light stabilizer (% by weight) | — | — |
|  |  | Glass transition temperature (° C.) | 28 | 28 |
|  | Tts of laminated glass (%) |  | 75 | 64 |
|  | Visible light transmittance of laminated glass (%) |  | 88 | 80 |
| Evaluation | (1) Ratio (weight average molecular weight A before light irradiation test/weight average molecular weight B after light irradiation test) |  | x | x |
|  | (2) Scorching in end part of laminated glass |  | x | x |

TABLE 2

|  |  |  | Example 5 | Example 6 | Example 7 | Example 8 |
|---|---|---|---|---|---|---|
| Configuration of laminated glass | First glass plate | Kind | Heat ray absorbing plate glass | Heat ray absorbing plate glass | Heat ray absorbing plate glass | Heat ray absorbing plate glass |
|  |  | Thickness (mm) | 1.9 | 1.9 | 1.9 | 1.9 |
|  |  | Solar transmittance (%) | 62 | 62 | 62 | 62 |
|  | Second glass plate | Kind | Green glass | Green glass | Green glass | Heat ray absorbing plate glass |

TABLE 2-continued

| | | | | | | |
|---|---|---|---|---|---|---|
| | | Thickness (mm) | 1.5 | 1.5 | 1.5 | 1.9 |
| | | Solar transmittance (%) | 70 | 70 | 70 | 62 |
| | Configuration of interlayer film | Kind of heat shielding substance | ITO particles | ITO particles | ITO particles | ITO particles |
| | | Amount of heat shielding substance (% by weight) | 0.15 | 0.15 | 0.15 | 0.15 |
| | | Kind of oxidation inhibitor | AO-40 | IRGANOX245 | IRGANOX1010 | IRGANOX1010 |
| | | Amount of oxidation inhibitor (% by weight) | 0.4 | 0.4 | 0.4 | 0.4 |
| | | Kind of light stabilizer | — | — | Tinuvin123 | Tinuvin765 |
| | | Amount of light stabilizer (% by weight) | — | — | 0.05 | 0.05 |
| | | Glass transition temperature (° C.) | 28 | 28 | 28 | 28 |
| | Tts of laminated glass (%) | | 56 | 56 | 56 | 53 |
| | Visible light transmittance of laminated glass (%) | | 75 | 75 | 75 | 71 |
| Evaluation | (1) Ratio (weight average molecular weight A before light irradiation test/weight average molecular weight B after light irradiation test) | | ○ | ○ | ○○ | ○○ |
| | (2) Scorching in end part of laminated glass | | ○ | ○ | ○○ | ○○ |

| | | | | Comparative Example 3 | Comparative Example 4 |
|---|---|---|---|---|---|
| | Configuration of laminated glass | First glass plate | Kind | Clear glass | Green glass |
| | | | Thickness (mm) | 2.5 | 1.9 |
| | | | Solar transmittance (%) | 82 | 70 |
| | | Second glass plate | Kind | Clear glass | Green glass |
| | | | Thickness (mm) | 2.5 | 1.9 |
| | | | Solar transmittance (%) | 82 | 70 |
| | | Configuration of interlayer film | Kind of heat shielding substance | ITO particles | ITO particles |
| | | | Amount of heat shielding substance (% by weight) | 0.15 | 0.15 |
| | | | Kind of oxidation inhibitor | IRGANOX1010 | IRGANOX1010 |
| | | | Amount of oxidation inhibitor (% by weight) | 0.4 | 0.4 |
| | | | Kind of light stabilizer | — | — |
| | | | Amount of light stabilizer (% by weight) | — | — |
| | | | Glass transition temperature (° C.) | 28 | 28 |
| | Tts of laminated glass (%) | | | 70 | 59 |
| | Visible light transmittance of laminated glass (%) | | | 87 | 79 |
| | Evaluation | (1) Ratio (weight average molecular weight A before light irradiation test/weight average molecular weight B after light irradiation test) | | x | x |
| | | (2) Scorching in end part of laminated glass | | x | x |

TABLE 3

|  |  |  | Example 9 | Example 10 | Example 11 | Example 12 |
|---|---|---|---|---|---|---|
| Configuration of laminated glass | First glass plate | Kind | Heat ray absorbing plate glass | Heat ray absorbing plate glass | Heat ray absorbing plate glass | Heat ray absorbing plate glass |
|  |  | Thickness (mm) | 1.9 | 1.9 | 1.9 | 1.9 |
|  |  | Solar transmittance (%) | 62 | 62 | 62 | 62 |
|  | Second glass plate | Kind | Green glass | Green glass | Green glass | Heat ray absorbing plate glass |
|  |  | Thickness (mm) | 1.5 | 1.5 | 1.5 | 1.9 |
|  |  | Solar transmittance (%) | 70 | 70 | 70 | 62 |
|  | First layer | Kind of heat shielding substance | ITO particles | ITO particles | ITO particles | ITO particles |
|  |  | Amount of heat shielding substance (% by weight) | 0.16 | 0.16 | 0.16 | 0.16 |
|  |  | Kind of oxidation inhibitor | AO-40 | IRGANOX245 | IRGANOX1010 | IRGANOX1010 |
|  |  | Amount of oxidation inhibitor (% by weight) | 0.4 | 0.4 | 0.4 | 0.4 |
|  |  | Kind of light stabilizer | — | — | Tinuvin123 | Tinuvin765 |
|  |  | Amount of light stabilizer (% by weight) | — | — | 0.05 | 0.05 |
|  |  | Glass transition temperature (° C.) | 2 | 2 | 2 | 2 |
|  |  | Thickness (μm) | 100 | 100 | 100 | 100 |
|  | Second and third layers | Kind of heat shielding substance | ITO particles | ITO particles | ITO particles | ITO particles |
|  |  | Amount of heat shielding substance (% by weight) | 0.16 | 0.16 | 0.16 | 0.16 |
|  |  | Kind of oxidation inhibitor | AO-40 | IRGANOX245 | IRGANOX1010 | IRGANOX1010 |
|  |  | Amount of oxidation inhibitor (% by weight) | 0.4 | 0.4 | 0.4 | 0.4 |
|  |  | Kind of light stabilizer | — | — | Tinuvin123 | Tinuvin765 |
|  |  | Amount of light stabilizer (% by weight) | — | — | 0.05 | 0.05 |
|  |  | Glass transition temperature (° C.) | 28 | 28 | 28 | 28 |
|  |  | Thickness (μm) | 375 | 385 | 380 | 380 |
|  | Tts of laminated glass (%) |  | 56 | 56 | 56 | 53 |
|  | Visible light transmittance of laminated glass (%) |  | 75 | 75 | 75 | 71 |
| Evaluation | (1) Ratio (weight average molecular weight A before light irradiation test/weight average molecular weight B after light irradiation test) |  | ○ | ○ | ○○ | ○○ |
|  | (2) Scorching in end part of laminated glass |  | ○ | ○ | ○○ | ○○ |

|  |  |  | Comparative Example 5 | Comparative Example 6 |
|---|---|---|---|---|
| Configuration of laminated glass | First glass plate | Kind | Clear glass | Green glass |
|  |  | Thickness (mm) | 2.5 | 1.9 |
|  |  | Solar transmittance (%) | 82 | 70 |
|  | Second glass plate | Kind | Clear glass | Green glass |
|  |  | Thickness (mm) | 2.5 | 1.9 |
|  |  | Solar transmittance (%) | 82 | 70 |
|  | First layer | Kind of heat shielding | ITO particles | ITO particles |

TABLE 3-continued

| | | | | |
|---|---|---|---|---|
| | | substance | | |
| | | Amount of heat shielding substance (% by weight) | 0.16 | 0.16 |
| | | Kind of oxidation inhibitor | IRGANOX1010 | IRGANOX1010 |
| | | Amount of oxidation inhibitor (% by weight) | 0.4 | 0.4 |
| | | Kind of light stabilizer | — | — |
| | | Amount of light stabilizer (% by weight) | — | — |
| | | Glass transition temperature (° C.) | 2 | 2 |
| | | Thickness (μm) | 100 | 100 |
| | Second and third layers | Kind of heat shielding substance | ITO particles | ITO particles |
| | | Amount of heat shielding substance (% by weight) | 0.16 | 0.16 |
| | | Kind of oxidation inhibitor | IRGANOX1010 | IRGANOX1010 |
| | | Amount of oxidation inhibitor (% by weight) | 0.4 | 0.4 |
| | | Kind of light stabilizer | — | — |
| | | Amount of light stabilizer (% by weight) | — | — |
| | | Glass transition temperature (° C.) | 28 | 28 |
| | | Thickness (μm) | 380 | 380 |
| | Tts of laminated glass (%) | | 70 | 59 |
| | Visible light transmittance of laminated glass (%) | | 87 | 79 |
| Evaluation | (1) Ratio (weight average molecular weight A before light irradiation test/weight average molecular weight B after light irradiation test) | | x | x |
| | (2) Scorching in end part of laminated glass | | x | x |

In Tables 1 to 3, description of ingredients other than the oxidation inhibitor, light stabilizer and heat shielding substance was omitted. In Tables 1 to 3, glass transition temperature, solar transmittance, Tts, and visible light transmittance are values measured in accordance with the aforementioned methods.

Specific Examples and Comparative Examples of an interlayer film having a one-layer structure are shown. It was confirmed that scorching in an end part of a laminated glass can be prevented owing to the layer corresponding to the interlayer film of Example even in the case of an interlayer film having a multi-layer structure in which the interlayer film of Example of the interlayer film having a one-layer structure in Tables 1, 2 is used as one layer (first layer in an interlayer film having a two or more-layer structure).

Also in the interlayer film having a multi-layer structure in Table 3, scorching in an end part of the laminated glass was prevented. It was also confirmed that the interlayer film having a three-layer structure shown in Table 3 is excellent in sound insulating properties.

EXPLANATION OF SYMBOLS

1: Interlayer film
1a: First surface
1b: Second surface
2: First layer
2a: First surface
2b: Second surface
3: Second layer
3a: Outer surface
4: Third layer
4a: Outer surface
11: Laminated glass
21: First glass plate
22: Second glass plate
31: Interlayer film
31a: First surface
31b: Second surface
41: Laminated glass

The invention claimed is:
1. A laminated glass comprising a first glass plate, a second glass plate, and an interlayer film, the interlayer film being arranged between the first glass plate and the second glass plate, at least one of the first glass plate and the second glass plate being a heat ray absorbing plate glass conforming to JIS R3208:1998, each of the first glass plate and the second glass plate having a thickness of 1.9 mm or less, the interlayer film having a two or more-layer structure, the interlayer film containing a hindered amine light stabilizer, the hindered amine light stabilizer being a hindered amine light stabilizer in which an alkyl group or an alkoxy group is bonded to a nitrogen atom of the piperidine structure, the interlayer film further containing an oxidation inhibitor, the oxidation inhibitor contained in the interlayer film consisting of (1) one or more oxidation inhibitors having a phenol skeleton, (2) one or more oxidation inhibitors containing a sulfur atom, or (3) one or more oxidation inhibitors having a phenol skeleton and one or more oxidation inhibitors containing a sulfur atom, when a layer having a lowest glass transition temperature in the interlayer film being referred to as a layer X, the layer X containing a thermoplastic resin, the interlayer film including the layer X as a first layer, the interlayer film including a second layer which contains a thermoplastic resin, the second layer being arranged on a first surface side of the first layer, the interlayer film contains a heat shielding substance, there is a portion where a lateral surface of the interlayer film is exposed in the laminated glass, black coating is not applied on an adhesion surface between an end part of the interlayer film and an end part of the first glass plate in the portion where the lateral surface of the interlayer film is exposed in the laminated glass, black coating is not applied on an adhesion surface between an end part of the interlayer film and an end part of the second glass plate in the portion where the lateral surface of the interlayer film is exposed in the laminated glass, a ratio (weight average molecular weight before light irradiation test/weight average molecular weight after light irradiation test) of a weight average molecular weight of the thermoplastic resin in a layer X before a light irradiation test, to a weight average molecular weight of the thermoplastic resin in a layer X after the light irradiation test in a measurement of weight average molecular weight of the layer X being 2 or less, the light irradiation test including: setting a thickness of the layer X to 150 μm to obtain the layer X before the light irradiation test; and subjecting the layer X before the light irradiation test to irradiation with xenon light at a black panel temperature of 63° C., a temperature inside a vessel of 50° C. and a humidity of 50% RH for 150 hours to obtain the layer X after the light irradiation test, the irradiation with xenon light being conducted with an irradiance of 60 W/m$^2$, a wavelength for measuring the irradiance of 300 to 400 nm, an inner filter of quartz, and an outer filter of quartz: #275 (cutoff 275 nm), the measurement of weight average molecular weight being conducted by measuring, for each of the layer X before the light irradiation test, and the layer X after the light irradiation test, a weight average molecular weight at a position of 70 mm inwardly from a lateral surface of the layer X.

2. The laminated glass according to claim 1, wherein the heat ray absorbing plate glass has a solar transmittance of 68% or less.

3. The laminated glass according to claim 1, wherein Tts of the laminated glass measured in conformity with ISO 13837 is 60% or less.

4. The laminated glass according to claim 1, wherein Tts of the first glass plate measured in conformity with ISO 13837 and Tts of the second glass plate measured in conformity with ISO 13837 are different from each other.

5. The laminated glass according to claim 1, wherein
the thermoplastic resin in the layer X is a polyvinyl acetal resin, an ionomer resin or an ethylene-vinyl acetate copolymer resin, or
the thermoplastic resin in the layer X is a thermoplastic elastomer.

6. The laminated glass according to claim 1, wherein
the interlayer film has a three or more-layer structure,
the interlayer film includes a third layer containing a thermoplastic resin, and
the third layer is arranged on a second surface side opposite to the first surface of the first layer.

7. The laminated glass according to claim 1, to be used as glass for windshield in an automobile.

8. The laminated glass according to claim 1, to be used as side glass, roof glass or glass for backlight in an automobile.

9. The laminated glass according to claim 1, wherein the ratio (weight average molecular weight before light irradiation test/weight average molecular weight after light irradiation test) is 1.6 or less.

10. The laminated glass according to claim 1, wherein the oxidation inhibitor contained in the interlayer film consists of an oxidation inhibitor having a phenol skeleton or an oxidation inhibitor containing a sulfur atom.

11. The laminated glass according to claim 1, wherein the interlayer film further comprises at least one selected from the group consisting of platinum particles, platinum particles coated with silica, palladium particles, and palladium particles coated with silica.

12. The laminated glass according to claim 1, wherein the interlayer film comprises at least one selected from the group consisting of a phthalocyanine compound, a naphthalocyanine compound, and an anthracyanine compound as the heat shielding substance.

* * * * *